United States Patent [19]
Shin et al.

[11] Patent Number: 5,482,589
[45] Date of Patent: Jan. 9, 1996

[54] METHOD AND APPARATUS FOR MAKING PRE-CUT PRE-PREG TAPE

[75] Inventors: Shoichi Shin, Shizuoka; Makoto Kawano, Numazu, both of Japan

[73] Assignee: Toshiba Kikai Kabushiki Kaisha, Tokyo, Japan

[21] Appl. No.: 293,316

[22] Filed: Aug. 22, 1994

[30] Foreign Application Priority Data

Aug. 25, 1993 [JP] Japan .................................. 5-210245

[51] Int. Cl.⁶ .................................................. B32B 31/18
[52] U.S. Cl. .......................... 156/268; 428/41; 428/42; 156/353; 156/267; 156/517; 156/265
[58] Field of Search ...................... 428/41, 42; 156/353, 156/267, 268, 269, 516, 517, 265, 266

[56] References Cited

U.S. PATENT DOCUMENTS

| | | | |
|---|---|---|---|
| 3,035,957 | 5/1962 | Morgan | 428/41 |
| 4,285,752 | 8/1981 | Higgins | 156/256 X |
| 4,537,809 | 8/1985 | Ang et al. | 428/41 |
| 4,978,417 | 12/1990 | Grimshaw et al. | 156/353 X |
| 5,064,130 | 11/1991 | Blaimschein et al. | 156/344 X |
| 5,066,352 | 11/1991 | Albers et al. | 156/267 X |
| 5,114,519 | 5/1992 | Grimshaw et al. | 156/267 X |
| 5,397,415 | 3/1995 | Manabe et al. | 156/267 X |

FOREIGN PATENT DOCUMENTS

| | | |
|---|---|---|
| 4130269A1 | 3/1992 | Germany . |
| 0168778 | 9/1985 | Japan .................................. 428/41 |
| 4-122611 | 4/1992 | Japan . |
| 2268703 | 1/1994 | United Kingdom .................. 156/269 |

OTHER PUBLICATIONS

European Search Report dated Dec. 7, 1994.
Klein, Allen J., "Automated Tape Laying", Advanced Composites Jan./Feb., 1989, pp. 44–52.
Ewald, Glenn W., "Two Stage Tape Placement Machine", 40th Annual Conference, Reinforced Plastics/Composites Inst., Jan.28–Feb. 1, 1985.

*Primary Examiner*—David A. Simmons
*Assistant Examiner*—Steven J. Helmer
*Attorney, Agent, or Firm*—Fish & Richardson

[57] ABSTRACT

A pre-preg pre-cut tape 20 is made by the steps of converting the forms of a pre-preg to be cut into co-ordinates on a pre-preg tape 2 from the data on the form of lamination and the condition of lamination to form the data on the form to be cut, forming the data on the forms of unnecessary portions showing the forms of the unnecessary portions 4 from the data on the forms to be cut, forming the data on division for dividing the forms of the unnecessary portions into the forms of (a) to (f) removable from a mold releasing paper, and forming the data on the direction of removal for showing the direction of removing the unnecessary portions of (a) to (f) divided on the basis of the data on division, whereby the unnecessary portions 4 are removed on the basis of such data.

4 Claims, 6 Drawing Sheets

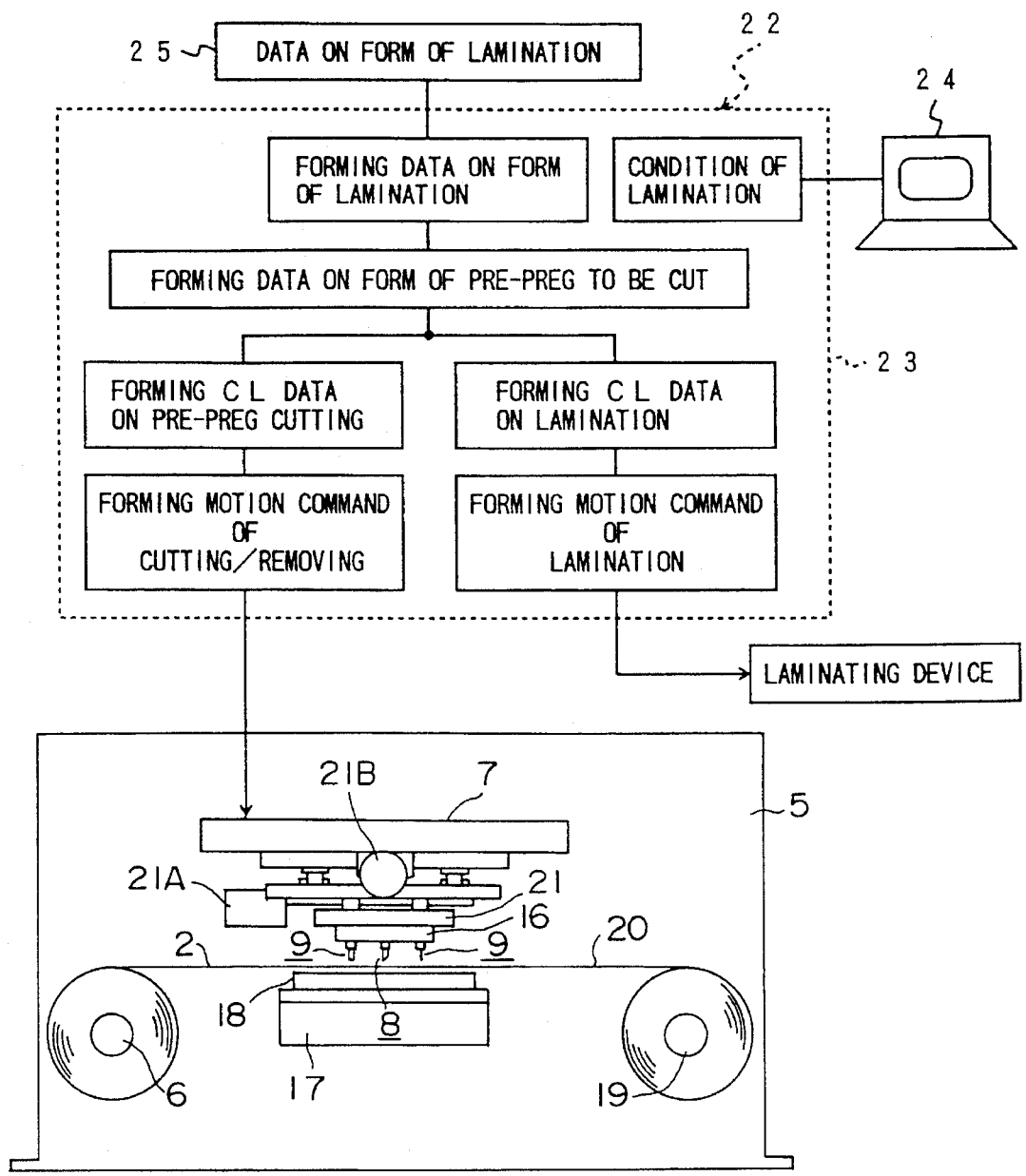
F I G . 1

METHOD AND APPARATUS FOR MAKING PRE-CUT PRE-PREG TAPE

FIELD OF THE INVENTION

This invention relates to a method and an apparatus for making a pre-cut pre-preg tape.

BACKGROUND OF THE INVENTION

Parts for aircraft, a wide variety of machine structural uses, sport and leisure articles and the like have been produced from composite materials. In this case, the composite material used is produced in such a manner that thermosetting resin or thermoplastic resin is impregnated into reinforced fiber such as carbon fiber, aramid fiber, boron fiber, glass fiber or the like to thereby prepare pre-pregs, which are in turn laminated with the orientation thereof being changed in every layer (hereinafter referred to as "a pre-preg laminated sheet"). This pre-preg laminated sheet is cut to the form adapted for a product to be produced, and a piece of the cut pre-preg laminated sheet (hereinafter referred to as "a pre-preg laminated material") is pressed and heated to provide it with a predetermined shape.

In the case where such a pre-preg laminated sheet is produced in the prior art, a method is adopted which comprises preparing a pre-preg tape by previously spreading the pre-preg on a flexible tape onto which silicon impregnation treatment is carried out on its one lateral surface (hereinafter referred to as "a mold releasing paper"), mounting the pre-preg tape on a pre-preg laminating means, and continuously orienting the pre-preg while delivering the pre-preg tape in order.

FIGS. 4 and 5 show an example of producing a pre-preg laminated sheet 1 using the pre-preg tape. In the case where a square pre-preg laminated sheet 1 is formed by orienting pre-pregs 12 in the direction of 45° and setting them, as shown in FIG. 4, if the pre-pregs 12 to be applied are deployed in order of being set, it becomes the arrangement as partially shown in FIG. 5. Hereupon, the portions 3 shown with oblique lines on the pre-preg tape 2 are necessary pre-pregs corresponding to the pre-pregs 12 to be applied, as shown in FIG. 4. On the other hand, the portions 4 to which oblique lines are not applied are unnecessary portions of the pre-pregs (unnecessary pre-pregs). It is preferable to keep the unnecessary pre-pregs 4 separated from the pre-preg tape 2 in order to continuously orient the pre-pregs using the pre-preg laminating means.

Heretofore, as an apparatus for making a pre-cut pre-preg tape 20 obtained by removing the unnecessary pre-pregs 4 from the pre-preg tape 2, is proposed a method and apparatus described in J.P.A Hei-4-122611. In such conventional method and apparatus, only the pre-pregs are cut into pre-cut pre-pregs, in order, in the forms corresponding to the forms of the necessary pre-pregs by means of a pre-preg cutting means with the mold releasing paper being left, and the unnecessary pre-pregs 4 on the mold releasing paper being removed with a scraper.

However, there is a problem in that some cases occur where removal of the unnecessary pre-pregs can not exactly be performed from the sizes and forms of the unnecessary pre-pregs 4 and their relation to the necessary pre-pregs in engagement therewith.

SUMMARY OF THE INVENTION

Accordingly, it is an object of the invention to provide a method and an apparatus for making a pre-cut pre-preg tape which makes it possible to correspond also to the form of complicated unnecessary pre-pregs.

In order to achieve the above-mentioned object of the invention, according to the invention, there is provided a method for making a pre-cut pre-preg tape composed of a pre-cut pre-preg and a mold releasing paper from a pre-preg tape consisting of the pre-preg and the mold releasing paper, which comprises the steps of pre-cutting only said pre-preg of said pre-preg tape into predetermined forms by means of a cutting and removing device having a tape feeding mechanism, a cutting mechanism and a removing mechanism;

cutting and dividing unnecessary portions of said pre-preg into predetermined sizes and forms; and removing each of said divided unnecessary portions in an order determined depending on the sizes and forms of said unnecessary portions and in the determined direction, thereby making said pre-cut pre-preg tape.

Further, there is also provided an apparatus for making a pre-cut pre-preg tape composed of a pre-cut pre-preg and a mold releasing paper by pre-cutting only the pre-preg of a pre-preg tape consisting of the pre-preg and the mold releasing paper into predetermined forms with a cutting and removing device having a tape feeding mechanism, a cutting mechanism and a removing mechanism and, thereafter, removing unnecessary portions, which comprises:

means for converting the forms of said pre-preg to be cut into co-ordinates on said pre-preg tape to form the data of the forms to be cut;

means for forming the data of the forms of said unnecessary portions showing the forms of said unnecessary portions from said data of the forms to be cut;

means for forming the data of division for dividing said forms of said unnecessary portions into forms removable from said mold releasing paper; and means for forming the data of the direction of removal for showing the direction of removal of the unnecessary pre-pregs divided on the basis of said data of division.

In the above-mentioned apparatus for making a pre-cut pre-preg tape, the forms of the pre-preg to be cut are converted into co-ordinates on the pre-preg tape in the process of forming the data of the forms to be cut. The forms of the unnecessary portions are shown from the data of the forms to be cut in the process of forming the data of the forms of the unnecessary portions. Subsequently, the forms of the unnecessary portions are divided into the forms removable from the mold releasing paper in the process of forming the data of division, and the direction of removing the unnecessary pre-pregs divided on the basis of the data of division is shown in the process of forming the data of the direction of removal, thereby making the forms of the unnecessary portions from the forms of the pre-preg tape to be cut in a course of lamination. Thereafter, a motion command for cutting the profile of the forms of the unnecessary portions by means of the cutting mechanism is formed, and the removing mechanism is selected depending on the forms of the unnecessary portions to perform the cutting and removing operations of the unnecessary portions having the complicated forms.

BRIEF DESCRIPTION OF THE DRAWINGS

Other objects and aspects of the invention will be apparent from the following description of embodiments with reference to the accompanying drawings in which:

FIG. 1 is a view showing a summary composition of an apparatus for making a pre-cut pre-preg tape;

DETAILED DESCRIPTION OF THE PREFERRED EMBODIMENT

Figure 2:
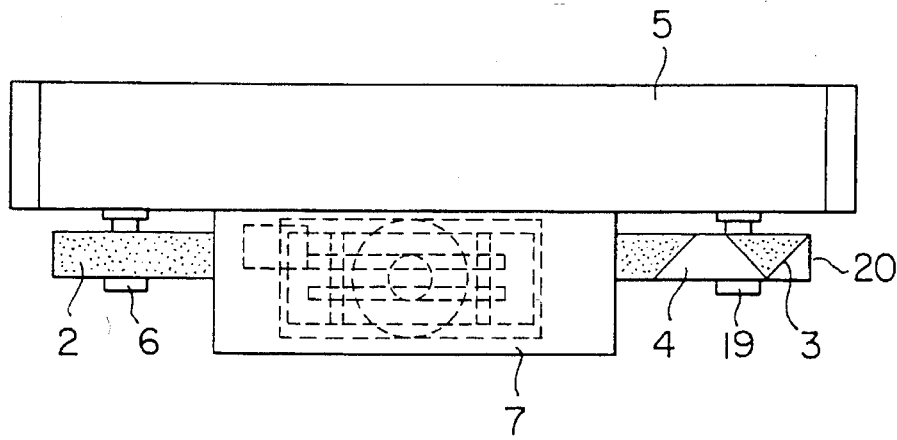
FIG. 2 is a plan view of the apparatus in FIG. 1.

Now, an embodiment of an apparatus for making a pre-cut pre-preg tape according to the invention will be explained with reference to FIGS. 1 to 3.

Reference character 5 in the drawings indicates a body frame, on which a supply reel 6 having a pre-preg tape wound is rotatably mounted at one end of the body frame.

At the downstream side of the supply reel 6 (the side of the running direction of the pre-preg tape 2) is arranged a cutting and removing device 7. This cutting and removing device 7 is provided with a cutting tool 8 as a cutting mechanism and removing tools 9 as removing mechanisms.

Figure 3:
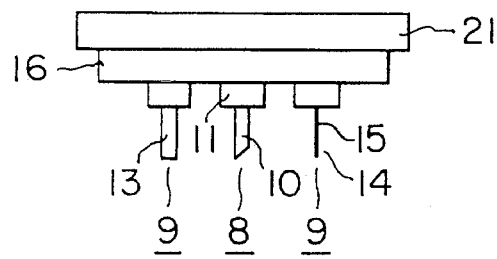
FIG. 3 is a front view of an essential portion of a cutting and removing device.

The cutting tool 8 is provided in the center of a turret 16, as shown in FIG. 3, has a cutter edge 10 and is secured to a ultrasonic wave oscillating holder 11, which is adapted to provide ultrasonic waves to the cutter edge 10 and cut only the pre-pregs 12 of the pre-preg tape 2. Further, referring to FIG. 3, the removing tools 9 are arranged at the left and right of the cutting tool 8 and provided with a spatula type removing tool 13 and a pin type removing tool 14. This cutting tool 8 and removing tools 9, 9 are each independently secured so as to be able to extend downwardly by a predetermined amount in FIG. 3.

The spatula type removing tool 13 is pressed against an unnecessary pre-preg having no apex, as described later, and strokes it in the width direction of the pre-preg tape 2 to remove the unnecessary pre-preg from the mold releasing paper. The pin type removing tool 14 is adapted to remove the unnecessary pre-preg from the mold releasing paper by thrusting the pin 15 into the unnecessary pre-preg having an apex in the vicinity of the apex thereof and moving the pin 15 in the width direction of the pre-preg tape 2. The turret 16 is fitted to a movable plate 21 for rotating motion in response to a command.

The movable plate 21 is movable in the longitudinal and width directions of the pre-preg tape 2 by means of servo motors 21A and 21B. Moreover, on the body frame 5 below the cutting and removing device 7 is arranged a horizontal table 17 with its one end being secured to the body frame 5, and on the horizontal table 17 is placed an anvil 18. The pre-preg tape 2 is adapted to run toward the downstream side while being in an abutting engagement with the upper surface of the anvil 18.

Reference character 19 indicates a take-up reel for the pre-cut pre-preg tape 20 which is obtained by removing the unnecessary pre-pregs 4 (refer to FIG. 5) from the pre-preg tape 2.

In addition, a control device 22 is connected to the cutting and removing device 7.

The control device 22 includes a control computer 23 and a CRT with a key board 24, the control computer 23 having an automatic programming function, host processor function, drawing function and the like, and the CRT with a key board 24 being adapted to provide a condition of lamination, that is, the width of the tape, the direction of lamination and the like.

Data on the forms of lamination are constructed from the data 25 on the forms of lamination of each layer (co-ordinate values of X, Y, Z in each point on the external forms of lamination) and the condition of lamination from the CRT with a key board 24, as described later in the automatic programming function and, so, the data on the form of the pre-preg to be cut is constructed on the basis of the data on the form of lamination. CL (cutter location) data on the lamination and the cutting of the pre-preg are further formed, and the respective CL data is converted to or form a laminating motion command of a laminating head (not shown) (NC (numerical control) data or the like) and a cutting motion command (NC data or the like) or a removing motion command (NC data or the like) by the cutting and removing device 7 with the host processor function. Further, the laminating motion command is delivered to the laminating head and the cutting motion command or the removing motion command is delivered to the cutting and removing device 7 by means of floppy disks or communicating means or the like.

Next, operation of the above-described embodiment will be explained with reference to FIGS. 4 to 13.

First, the unnecessary form of the pre-preg to be laminated is determined from the form of lamination.

Figure 4:
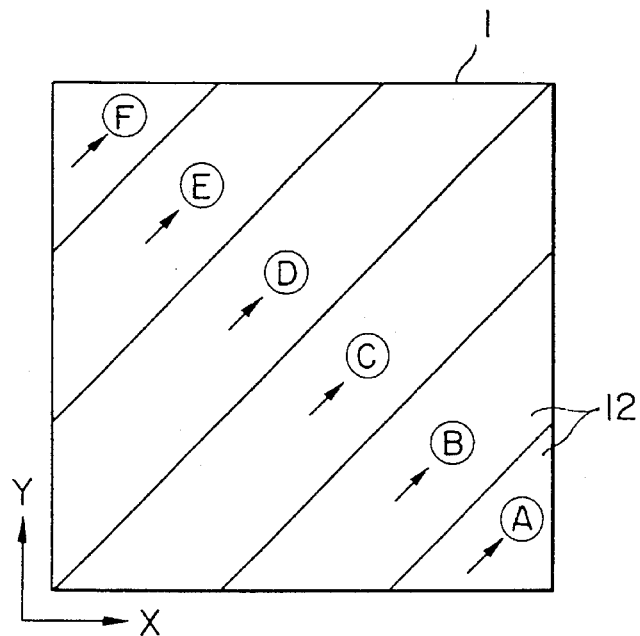
FIG. 4 is a plan view showing the laminated state of pre-pregs in one layer.

FIG. 4 shows an example of the state of lamination of one layer of the pre-preg laminated sheet 1, in which the direction of lamination (arrow marks) and the order of lamination of A to F are shown. The forms of the respective pre-pregs 12 to be laminated can be determined from co-ordinates on the horizontal table 17 with the external form of lamination, the width of the tape, the direction of lamination, the amount of gap between the pre-pregs 12 and the like as parameters.

The pre-cut pre-preg tape 20 obtained by pre-cutting the pre-preg tape 2 and removing the unnecessary pre-pregs 4 by the cutting and removing device 7 is wound on to the take-up reel 19. In the case where the pre-cut pre-preg tape 20 wound on to the take-up reel 19 is laminated using a laminating head, it is to be noted that the portion of the pre-cut pre-preg tape 20 wound initially after passing through the cutting and removing device 7 appears as the final portion when delivered to the laminating head and, simultaneously, the portion wound finally appears as the first portion conversely when delivered. Moreover, in the case where the pre-cutting operation and the removing operation of the unnecessary pre-pregs 4 are performed using the cutting and removing device 7, the pre-pregs come to the surface side and the mold releasing paper comes to the back side. However, when performing the laminating operation using the laminating head, it is also to be noted that the surface side which is brought into an abutting engagement with the laminating head comes to the mold releasing paper side and the pre-pregs 12 come to the back side.

Figure 5:
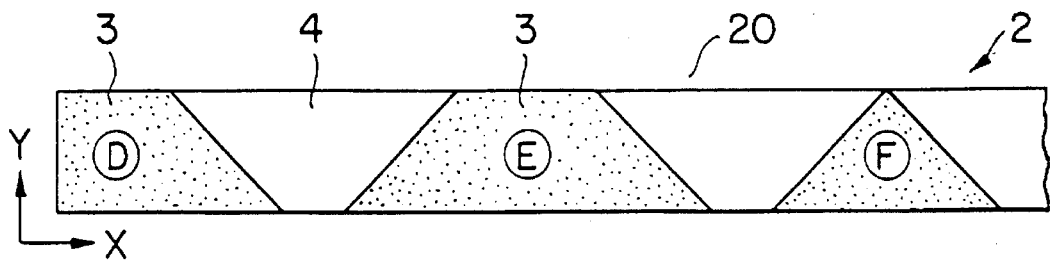
FIG. 5 is a plan view of a pre-cut pre-preg tape arranged in the order contrary to that of laminating the forms of the laminated pre-pregs in FIG. 4.

With the above-described points in mind, the forms of the pre-pregs 12 laminated, as shown in FIG. 4, are converted to co-ordinates on the pre-preg tape 2. Namely, the data for determining the form of the pre-preg tape 2 to be cut are formed with the longitudinal direction of the pre-preg tape 2 as X and the width direction thereof as Y, as shown in FIG. 5. At this time, the pre-preg tape 2, which is pre-cut by the cutting and removing device 7 and from which the unnecessary pre-pregs 4 are removed, as described above, is used so that the frontmost end of the wound tape comes to the rearmost end of the tape to be delivered, when the laminating operation is performed; therefore, when forming the above-described data, co-ordinates of the X direction are converted so that the pre-cutting operation is performed in the order opposite to the order of being laminated.

Figure 6:
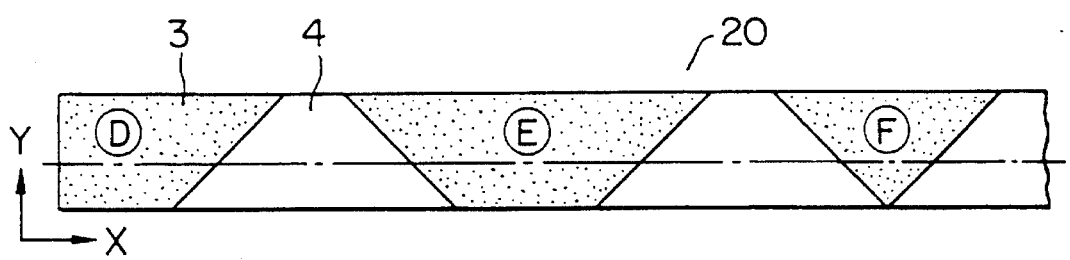
FIG. 6 is a plan view of a pre-cut pre-preg tape turned upside down.

Next, the case where the pre-cutting operation is performed and the case where the function of lamination is performed come to be reversed in the relation of the surface and back of the pre-preg and the mold releasing paper and, therefore, when performing the pre-cutting operation, it is necessary to previously keep the form to be cut in the direction of Y reverse, taking the matter of laminating operation into consideration. Namely, taking into consideration the delivery at the time of the laminating operation of the pre-cut pre-preg tape 20, the pre-cut data formed, as shown in FIG. 5, requires inverting the data in the Y direction about the center line of the tape width, as shown in FIG. 6.

Figure 7:
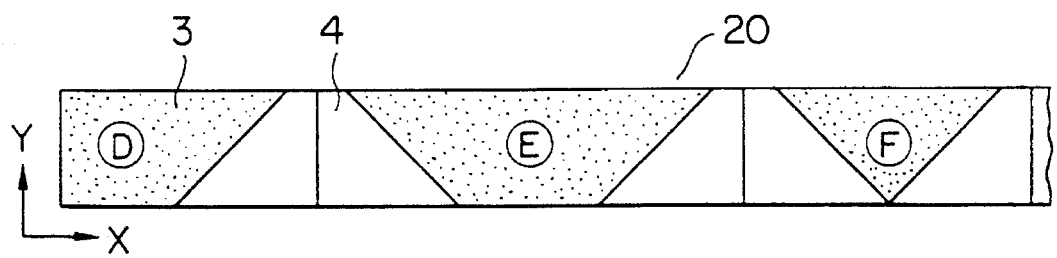
FIG. 7 is a plan view of a pre-cut pre-preg tape in which the forms of the unnecessary portions are formed and arranged.

Subsequently, the data on the unnecessary forms is formed from the pre-cut data on the pre-preg tape 2 formed in a manner as described above. Namely, the data of the necessary forms is formed on the pre-preg tape 2, as shown in FIG. 7 and, then, the data on the unnecessary forms is formed from the data showing the above-mentioned necessary form.

Figure 8:
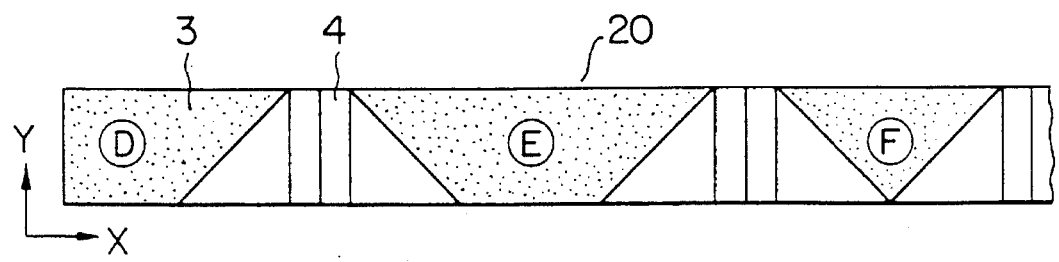
FIG. 8 is a plan view of the unnecessary portions divided in the direction of width from the apexes of the unnecessary portions.

Thereafter, the regions to be removed are formed from the data of the unnecessary forms. Namely, in order to form the region to be removed from the data of the unnecessary forms, a perpendicular is dropped from the apex of the pre-preg 4 of each unnecessary portion in the direction of width of the pre-preg tape 2 (the Y direction), as shown in FIG. 8, to thereby divide the form of each of the unnecessary portions into triangles or trapezoids. The future treatment of removing the pre-pregs of the unnecessary portions is performed in the units such as the divided triangles or the divided trapezoids.

Figure 9:
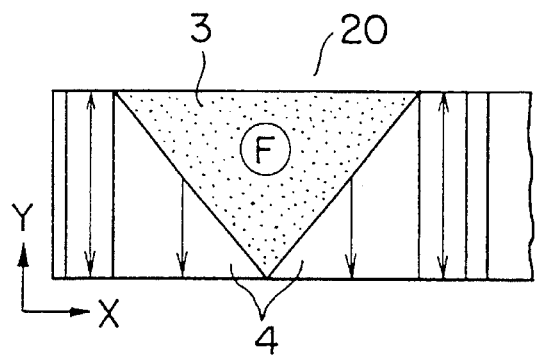
FIG. 9 is a plan view showing the state where the direction of removal of the unnecessary portions is determined from a relation to the necessary forms.

Subsequently, the direction of removing each of the regions to be removed is determined. Namely, as shown in FIG. 9, for example, the figure of the necessary pre-preg 3 is extracted, and the direction of removing each of the regions to be removed (the direction of scraping out the unnecessary pre-pregs 4 from the pre-preg tape 2 with the removing tool 9) is determined in relation to the figures of the necessary pre-pregs 3.

Figure 10:
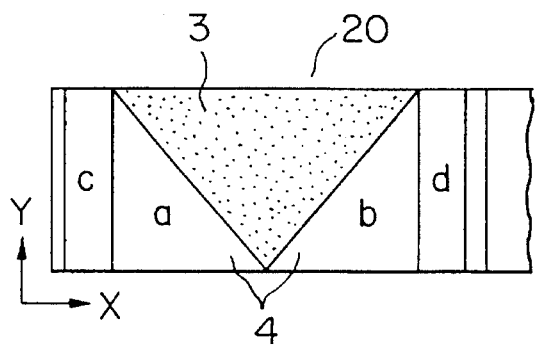
FIG. 10 is a plan view showing an order of removing the unnecessary portions.

Further, the order of removing each region to be removed is determined. Namely, as shown in FIG. 10, the adjacent relation of each region to be removed is examined, and the order of removal (a to d) is determined so that the unnecessary pre-pregs 4 are discharged out of the pre-preg tape 2 without being obstructed by the necessary pre-pregs 3.

Figure 11:
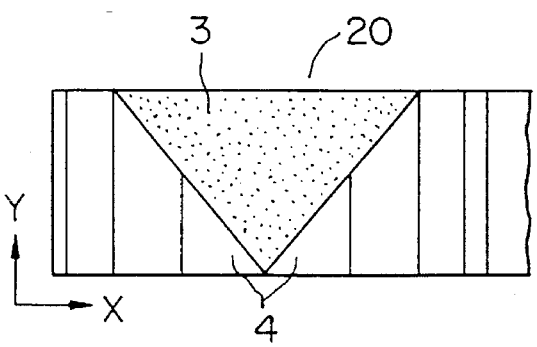
FIG. 11 is a plan view of the unnecessary portions in FIG. 10 being divided into the widths which allow the unnecessary portions to be removed.

Moreover, each region to be removed is divided into such widths as to be able to be easily removed by the removing tool 9. Namely, as shown in FIG. 11, each region to be removed is divided so that it can be removed with one removing motion. Hereupon, a motion command for cutting the profile of the unnecessary form divided into triangles or trapezoids, by the cutter edge 10 is formed.

Figure 12:
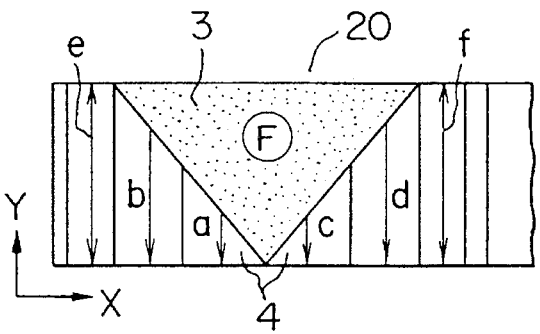
FIG. 12 is a plan view showing the direction of a command for removal motion of the unnecessary portions.
Figure 13:
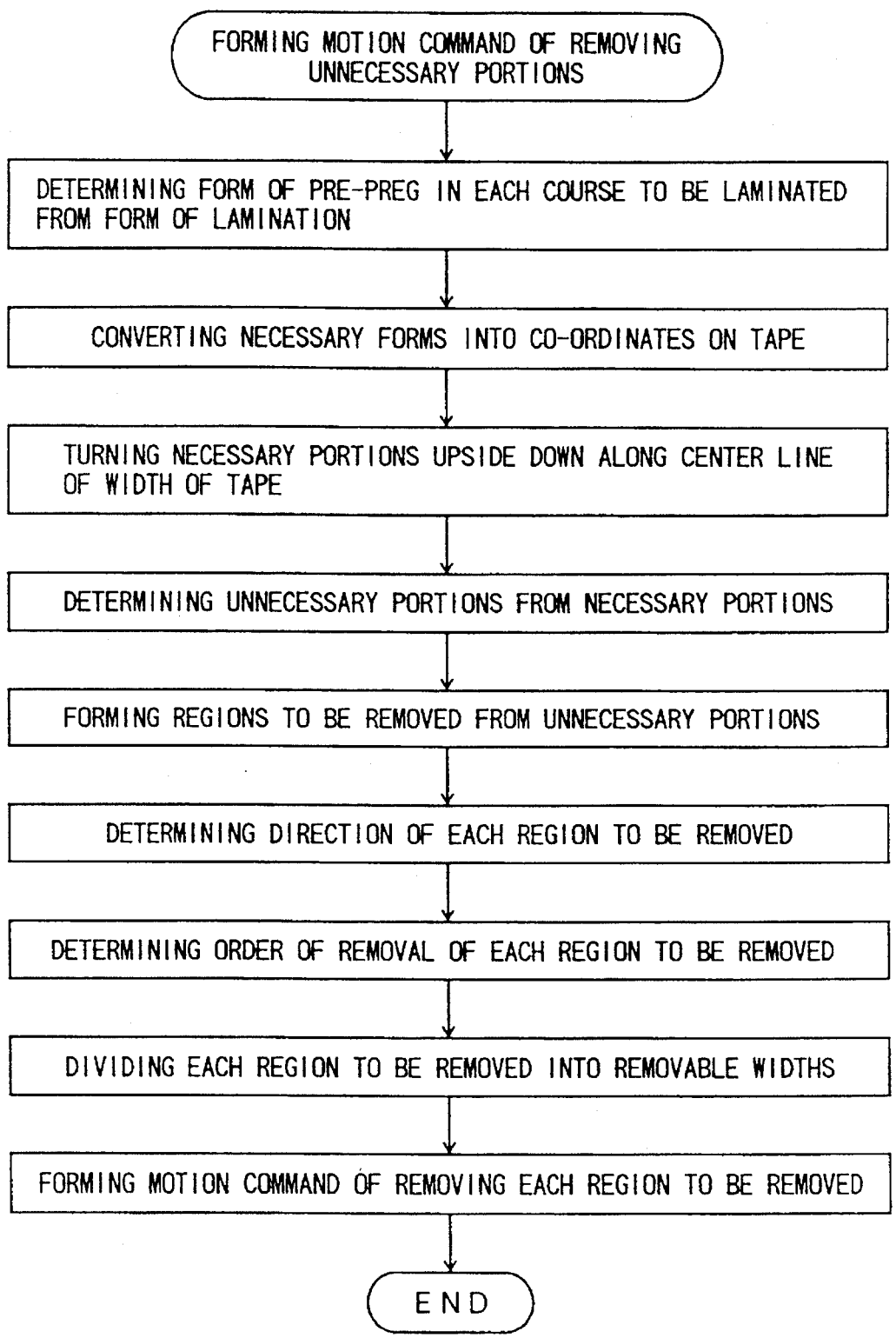
FIG. 13 is a flow chart showing a treatment flow of removal of the unnecessary portions of the pre-cut pre-preg.

Finally, a motion command for removing each region to be removed using the removing tools 9 is formed (refer to FIG. 12). The removing tools comprise a spatula type removing tool 13 and a pin type removing tool 14, and the pin type removing tool 14 is used for a form which can not be removed with the spatula type removing tool 13. The motion of removal of the spatula type removing tool 13 consists of a motion in the width direction of the pre-preg tape 2 (the Y direction) and a motion of scraping out obliquely along the form. In the form having an apex (apex angle of 180 degrees and below), the pin type removing tool 14 is moved from the apex along a bisector of the apex angle. The processes as described above are shown as a flow in FIG. 13. These processes are all carried out with a control device 22 for the cutting and removing device 7.

Figure 14:
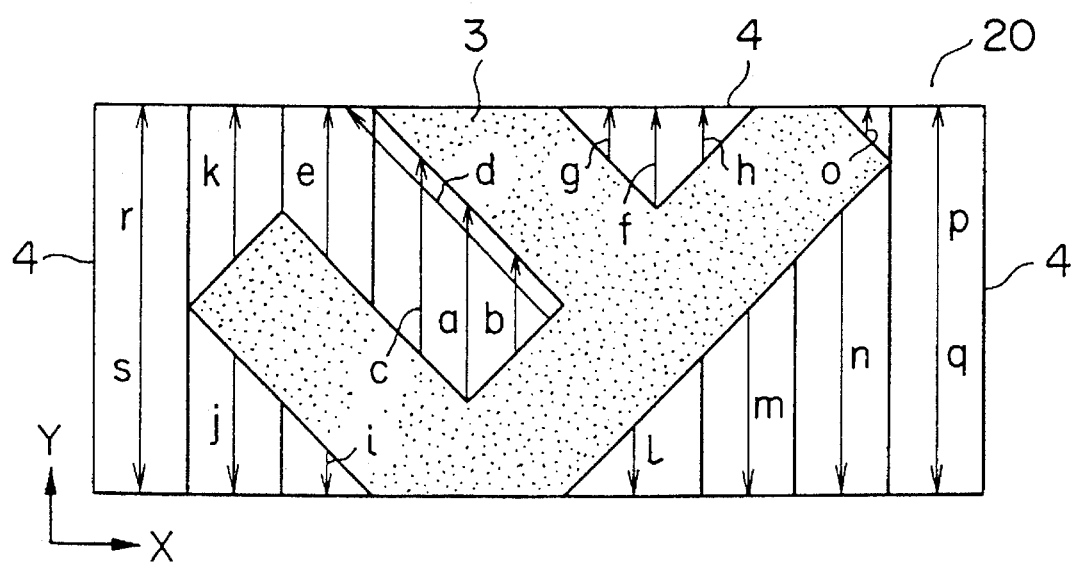
FIG. 14 is a plan view showing an example of removal motion of the forms of the complicated unnecessary portions.

FIG. 14 shows an example of complicated unnecessary forms, which are cut by the cutter edge 10 and, thereafter, the unnecessary pre-pregs 4 are removed according to the order of "a" to "s". "a" and "f" indicate the loci removed by the pin type removing tool 14, and the others indicate the loci removed by the spatula type removing tool 13.

As explained above, the method for making a pre-cut pre-preg tape according to the invention allows the unnecessary pre-pregs to be exactly removed without disturbing the necessary pre-pregs, since, in a method of making a pre-cut pre-preg tape by pre-cutting only the pre-preg of a pre-preg tape into predetermined forms and, thereafter, removing the unnecessary portions, according to the invention, the unnecessary portions are cut and divided into predetermined sizes and forms, and each of the divided unnecessary portions is removed in the order determined depending on the sizes and forms of the unnecessary portions and in the determined direction. Further, an apparatus for making a pre-cut pre-preg tape to carry out the above-mentioned method comprises means for converting the forms of the pre-pregs to be cut into co-ordinates to form the data on the forms to be cut; means for forming the data on the forms of the unnecessary portions from the data of the forms to be cut; means for forming the data on division for dividing the forms of the unnecessary portions into removable forms; and means for forming the data on removing direction for indicating the direction of removal of the unnecessary pre-pregs and, therefore, provides advantageous effects that only if the condition of lamination such as the form to be laminated, the width of a pre-preg tape, the direction of lamination and the like is input, a high quality of pre-cut pre-preg tape can be obtained and the productivity thereof is greatly increased.

What is claimed is:

1. A method for making a pre-cut pre-preg tape composed of a pre-cut pre-preg and a mold releasing paper from a pre-preg tape consisting of the pre-preg and the mold releasing paper, which comprises the steps of:

pre-cutting only said pre-preg of said pre-preg tape into predetermined forms by means of a cutting and removing device having a tape feeding mechanism, a cutting mechanism and a removing mechanism;

cutting and dividing unnecessary portions of said pre-preg into predetermined sizes and forms; and removing each of said divided unnecessary portions in an order determined depending on the sizes and forms of said unnecessary portions and in a determined direction, thereby making said pre-cut pre-preg tape.

2. A method for making a pre-cut pre-preg tape composed of a pre-cut pre-preg and a mold releasing paper by pre-cutting only the pre-preg of a pre-preg tape consisting of the pre-preg and the mold releasing paper into predetermined forms with a cutting and removing device having a tape feeding mechanism, a cutting mechanism and a removing mechanism and, thereafter, removing unnecessary portions, which comprises:

a step of converting forms of said pre-preg to be cut into co-ordinates for said pre-preg tape to form the data for the forms to be cut;

a step of generating data for the forms of the unnecessary portions showing the forms of said unnecessary portions from said data on the forms to be cut;

a step of generating data on division for dividing said forms of said unnecessary portions into forms removable from said mold releasing paper; and a step of generating data on a direction of removal for showing the direction of removal of the unnecessary pre-pregs divided on the basis of said data on division, whereby cutting and removing operations of said unnecessary portions are performed using said data formed in said steps.

3. A method for making a pre-cut pre-preg tape claimed in claim 2, further including a step of generating data on the order of removal for determining an order of removing said unnecessary portions, which have been cut, from said pre-preg tape depending on the forms thereof.

4. A method for making a pre-cut pre-preg tape claimed in claim 2 or 3, further including a step of generating data on designation of a removing tool for selecting the removing tool of said removing mechanism according to said forms of said unnecessary portions.

* * * * *